United States Patent Office 3,159,640
Patented Dec. 1, 1964

3,159,640
PROCESS FOR PREPARING 2-MERCAPTO-PYRIDINE-N OXIDE
Robert E. McClure, Hamden, and David A. Shermer, Branford, Conn., assignors to Olin Mathieson Chemical Corporation, a corporation of Virginia
No Drawing. Filed Apr. 23, 1963, Ser. No. 274,927
7 Claims. (Cl. 260—294.8)

This invention relates to the preparation of 2-mercaptopyridine-N-oxide. More particularly, it relates to the mercaptization of 2-halo-pyridine-N-oxide.

This application is a continuation-in-part of our pending application Serial No. 758,927, filed September 4, 1958, now abandoned.

Heavy metal derivatives of 2-mercaptopyridine-N-oxide are agricultural fungicides and their preparation is described in U.S. Patent No. 2,809,971.

The preparation of 2-mercaptopyridine-N-oxide is also known. For instance, it is known to prepare the compound by treating a 2-holopyridine-N-oxide with sodium hydrosulfide in aqueous solution under a slightly alkaline condition. The reaction proceeds according to the following equation in which X is a halogen substituent:

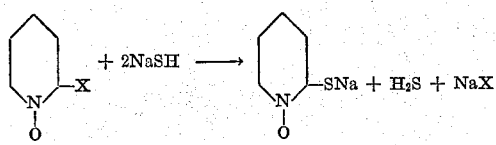

However, this reaction has serious disadvantages when practiced on a commercial scale, since a mole of hydrogen sulfide is produced for every mole of desired product. This amounts to over 4500 cubic feet or about 440 pounds of the gas per ton of desired product representing a sulfur loss of about 415 pounds per ton of product. Further, since the reaction proceeds quickly, it is necessary to have a large scrubbing system to recover or dispose of the rapidly liberated hydrogen sulfide.

Again, E. Shaw et al., in 72 JACS 4362 (1950), show that treating 2 - bromopyridine - N - oxide hydrochloride, which is neutralized with caustic, with sodium hydrosulfide achieves only a 61% yield of 2-mercaptopyridine-N-oxide and that similar results are achieved when sodium sulfide is employed. Moreover, when sodium sulfide is employed the reaction is made unsatisfactory, because of by-product formation which seriously diminishes the yield and hampers product recovery. This by-product formation proceeds according to the following equations:

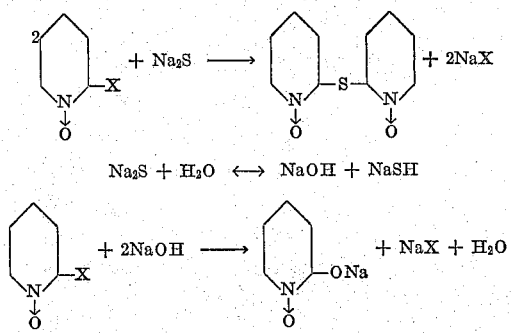

Unless reaction conditions are very carefully controlled, these reactions can consume up to 15% of the 2-bromopyridine-N-oxide.

It has now been found, surprisingly, that if the mercaptization of a 2-halopyridine-N-oxide is carried out with a mixture of alkali metal sulfide and alkali metal hydrosulfide, substantially no hydrogen sulfide is evolved and a substantially 100% yield is achieved.

According to the process of the present invention, aqueous 2-halopyridine-N-oxide is reacted with an aqueous solution of, for example, sodium sulfide and sodium hydrosulfide at from about 75° C. to 110° C. Care should be taken not to heat, for example, 2-chloropyridine-N-oxide in dry form, since it can undergo violent decomposition when not in solution. On the other hand, the amount of water in which the mixed sulfide and hydrosulfide are dissolved is not critical. It is, however, inconvenient to have a saturated solution of such mixture or a very dilute reaction mixture.

As for proportions, it is preferable to employ from 1 to 4, more preferably 1 to 3, moles of the mixed alkali metal sulfide and alkali metal hydrosulfide per mole of 2-halopyridine-N-oxide and about 0.3 to 5.0, more preferably 0.5 to 5.0, moles of alkali metal sulfide per mole of alkali hydrosulfide with enough water to dissolve them. When such proportions are employed, the reaction is substantially complete in 10 to 15 minutes and a quantitative yield of the alkali metal salt of 2-mercaptopyridine-N-oxide can be formed by maintaining the reaction mixture at about 90° C. for a total of from about 30 to 45 minutes. Thereafter, the heavy metal derivatives of 2-mercaptopyridine-N-oxide, useful as agricultural fungicides, can readily be prepared by adding a heavy metal salt directly to the acidified reaction mixture of the process of the present invention without isolation of the 2-mercaptopyridine-N-oxide. Otherwise, the free 2-mercaptopyridine-N-oxide can be recovered by acidifying the reacted mixture and cooling it to crystallize the product. Either way, the process of the present invention gives up to 100% yield of 2-mercaptopyridine-N-oxide and little or no evolution of hydrogen sulfide.

Another especially advantageous adaptation of the present process involves the preparation of the 2-halopyridine-N-oxide by oxidation of a 2-halopyridine with peracetic acid or a mixture of acetic acid and hydrogen peroxide. The reaction mixture of this preparation can be treated with the mercaptizing mixture of alkali metal sulfide and alkali metal hydrosulfide directly after having its pH adjusted to about neutral with, for example, caustic and it is unnecessary, therefore, to isolate the 2-halopyridine-N-oxide prior to its conversion to the desired mercaptized product.

The following examples further illustrate the present invention:

Example I

An aqueous solution containing about 2500 grams of water and about 500 grams of 2-chloropyridine-N-oxide was placed in a 5-liter flask fitted with a stirrer, thermometer, reflux condenser addition funnel. This solution was heated to 95° C. and a solution of 274 grams of sodium sulfide and 93 grams of sodium hydrosulfide in 1732 grams of water was added thereto over a period of 6 minutes. The mixture was cooled to 25° C. and the analytically determined conversion to the sodium salt of 2-mercaptopyridine-N-oxide was over 99%. There was no visible evolution of hydrogen sulfide throughout the reaction period.

Example II

An aqueous solution containing about 120 grams of water and about 0.2 mole of 2-chloropyridine-N-oxide was heated to 95° C. in a one liter flask equipped with a stirrer, thermometer, reflux condenser and addition funnel. An aqueous solution containing 150 grams of water, 0.12 mole of sodium sulfide and 0.22 mole of sodium hydrosulfide was added to the flask over a 10 minute period. After the addition was completed, the reaction mixture was heated at 95° C. for an additional 30 minutes. Analysis of the cooled reaction product indicated a 97.5% yield of the sodium salt of 2-mercaptopyridine-N-oxide.

There was no visible evolution of hydrogen sulfide throughout the course of the reaction.

*Example III*

An aqueous solution containing about 110 grams of water and about 0.2 mole of 2-chloropyridine-N-oxide was heated to 95° C. in a one liter flask equipped with a stirrer, thermometer, reflux condenser and addition funnel. An aqueous solution containing 130 grams of water, 0.19 mole of sodium sulfide and 0.6 mole of sodium hydrosulfide was added to the flask over a 25 minute period. After the addition was completed the reaction mixture was heated at 95° C. for an additional 25 minutes. Analysis of the cooled reaction product indicated a 98% yield of the sodium salt of 2-mercaptopyridine-N-oxide. There was no visible evolution of hydrogen sulfide throughout the course of the reaction.

We claim:

1. A process for the production of 2-mercaptopyridine-N-oxide comprising reacting a 2-halopyridine-N-oxide with a mixture of an alkali metal sulfide and an alkali metal hydrosulfide, the alkali metal sulfide being in a molar ratio with the alkali metal hydrosulfide of from about 0.3:1 to 5.0:1.

2. A process for the production of 2-mercaptopyridine-N-oxide comprising reacting an aqueous solution of 1 mole of 2-halopyridine-N-oxide with an aqueous solution of from about 1 to 3 moles of a mixture of an alkali metal sulfide and an alkali metal hydrosulfide, the alkali metal sulfide being in a molar ratio with the alkali metal hydrosulfide of from about 0.5:1 to 5.0:1, at from about 75° C. to 110° C.

3. The process of claim 2 in which the 2-halopyridine-N-oxide is 2-chloropyridine-N-oxide.

4. The process of claim 2 in which the alkali metal sulfide is sodium sulfide and the alkali metal hydrosulfide is sodium hydrosulfide.

5. The process of claim 1 in which 1 mole of 2-halopyridine-N-oxide is reacted with about 1 to 4 moles of the mixture of alkali metal sulfide and alkali metal hydrosulfide.

6. The process of claim 1 in which the 2-halopyridine-N-oxide is 2-chloropyridine-N-oxide.

7. The process of claim 6 in which the alkali metal sulfide is sodium sulfide and the alkali metal hydrosulfide is sodium hydrosulfide.

No references cited.